US008473357B2

(12) United States Patent
Tan et al.

(10) Patent No.: US 8,473,357 B2
(45) Date of Patent: Jun. 25, 2013

(54) ENHANCED SUPPLIER CATALOG COLLABORATION

(75) Inventors: Karlay Tan, Foster City, CA (US); Lee Hian Quek, Foster City, CA (US); Margaret Lloyd, Menlo Park, CA (US); Suman Guha, Fremont, CA (US); Amol Tiwari, Andhra Pradesh (IN); Anurag Khanna, Andhra Pradesh (IN)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 12/567,892

(22) Filed: Sep. 28, 2009

(65) Prior Publication Data

US 2011/0078046 A1 Mar. 31, 2011

(51) Int. Cl.
*G06Q 30/00* (2012.01)
(52) U.S. Cl.
USPC ........................................ 705/26.1; 705/27.1
(58) Field of Classification Search
USPC ................................. 705/26.1, 27.1
See application file for complete search history.

(56) References Cited

U.S. PATENT DOCUMENTS

| 5,870,717 | A | 2/1999 | Wiecha |
| 6,606,603 | B1 | 8/2003 | Joseph et al. |
| 7,082,408 | B1 * | 7/2006 | Baumann et al. ............... 705/26 |
| 7,165,041 | B1 * | 1/2007 | Guheen et al. .................. 705/26 |
| 2005/0049926 | A1 * | 3/2005 | Petong ............................ 705/26 |
| 2005/0251409 | A1 | 11/2005 | Johnson |
| 2008/0300959 | A1 | 12/2008 | Sinha |

FOREIGN PATENT DOCUMENTS

| WO | WO9933007 A1 | 7/1999 |
| WO | WO03019326 A2 | 3/2003 |

OTHER PUBLICATIONS

"People Soft Enterprise Catalog Management", Facilitating Internet-Based Catalog Management, An Oracle White Paper, Dec. 2002, pp. 1-13, Oracle Peoplesoft Enterprise, http://www.oracle.com/media/peoplesoft/en/pdf/ whitepapers/e_srm_wp_catalogmgmt_0706.pdf.
"Power Your Procurement Evolution with SAP SRM", Reduce Procurement Costs and Collaborate with Suppliers, SAP Solution Brief, pp. 1-4, http://download.sap.com/download.epd?context=86E829523E840D804E30DBDD63B3A9E29E27765D3B893AA7F76FCBD7FCADA68F7A354C4A7834F695D25308B968E9E49BF420C4D83C575175.
Catalogue Manager, "Hassle-free Catalogue Management", Perfect Commerce, 2004, pp. 1-2, http://www.commerceone.net/images/pdf/DS1005%20Catalogue%20Manager%20datasheet(new).pdf.
Supplier Catalog Management, Supplier Catalog Content Management, Ketera Technologies, Inc., 2009, p. 1, http://www.ketera.com/solutions/supplier_management.html.

\* cited by examiner

*Primary Examiner* — Courtney Stopp
(74) *Attorney, Agent, or Firm* — Miles & Stockbridge P.C.

(57) ABSTRACT

One embodiment of the invention includes a computer-implemented method for supplier update of a procurement system. The method includes providing a customizable procurement entity to a supplier, receiving a modified procurement entity from the supplier, wherein the modified procurement entity comprises an update made by the supplier to the customizable procurement entity, reviewing and approving the modified procurement entity, and publishing the modified procurement entity to the procurement system.

12 Claims, 12 Drawing Sheets

Fig. 6

Manage Supplier Content Map Sets

700

⊖ Search

| | | |
|---|---|---|
| Procurement BU | [×] | Description |
| Map Set | | |

[Search] [Reset]

[Close]

710

Search Results

720

730 → Actions ▼ View Format 🔍 📋 ✏ ✖

| Procurement BU | Map Set | Default in Procurement BU | Manage Maps | Description | Associated Catalog |
|---|---|---|---|---|---|
| A | Default - A | ✓ | 🔍 | Description text | |
| A | Dell | | 🔍 | Description text | Dell Computers UK (direct) |
| B | Default - B | ✓ | 🔍 | Description text | |
| B | Office Supplies | | 🔍 | Description text | Multiple |

Fig. 12 ated to
ENHANCED SUPPLIER CATALOG COLLABORATION

FIELD

Embodiments of the invention are generally related to computer systems and, in particular, to an apparatus, computer readable media and/or method for a procurement system with enhanced supplier catalog collaboration.

BACKGROUND

Procurement systems generally encompass software systems for electronic purchasing, i.e., the acquisition of goods and/or services. Procurement or purchasing departments of companies may utilize procurement systems, including online or electronic catalogs, to facilitate the purchase of goods, products, and/or services from suppliers. As a result, the procurement or purchasing departments need to constantly collaborate with suppliers to ensure that the procurement catalog contents and definitions are set up correctly. This often results in lower efficiency and higher turnaround time. Delays and errors may require additional time to troubleshoot and reconcile after requisitions or purchase orders have been created. Therefore, there is a need for a procurement system that provides enhanced capabilities.

SUMMARY

One embodiment of the invention includes a computer-implemented method for supplier update of a procurement system. The method includes providing a customizable procurement entity to a supplier, and receiving a modified procurement entity from the supplier. The modified procurement entity comprises an update made by the supplier to the customizable procurement entity. The method may further include reviewing and approving the modified procurement entity, and publishing the modified procurement entity to the procurement system.

Another embodiment of the invention includes a procurement system. The system includes a transmitter configured to provide a customizable procurement entity to a supplier, and a receiver configured to receive a modified procurement entity from the supplier. The modified procurement entity comprises an update made by the supplier to the customizable procurement entity. The procurement system is configured to allow for review and approval of the modified procurement entity. The system may further include a publisher configured to publish the modified procurement entity to the procurement system.

BRIEF DESCRIPTION OF THE DRAWINGS

For proper understanding of the invention, reference should be made to the accompanying drawings, wherein:

FIG. 6 illustrates a user interface according to another embodiment;

FIG. 7 illustrates a user interface according to another embodiment;

FIG. 8 illustrates a user interface according to another embodiment;

FIG. 11 illustrates a user interface according to another embodiment;

FIG. 12 illustrates a user interface according to another embodiment.

DETAILED DESCRIPTION

Figure 1:
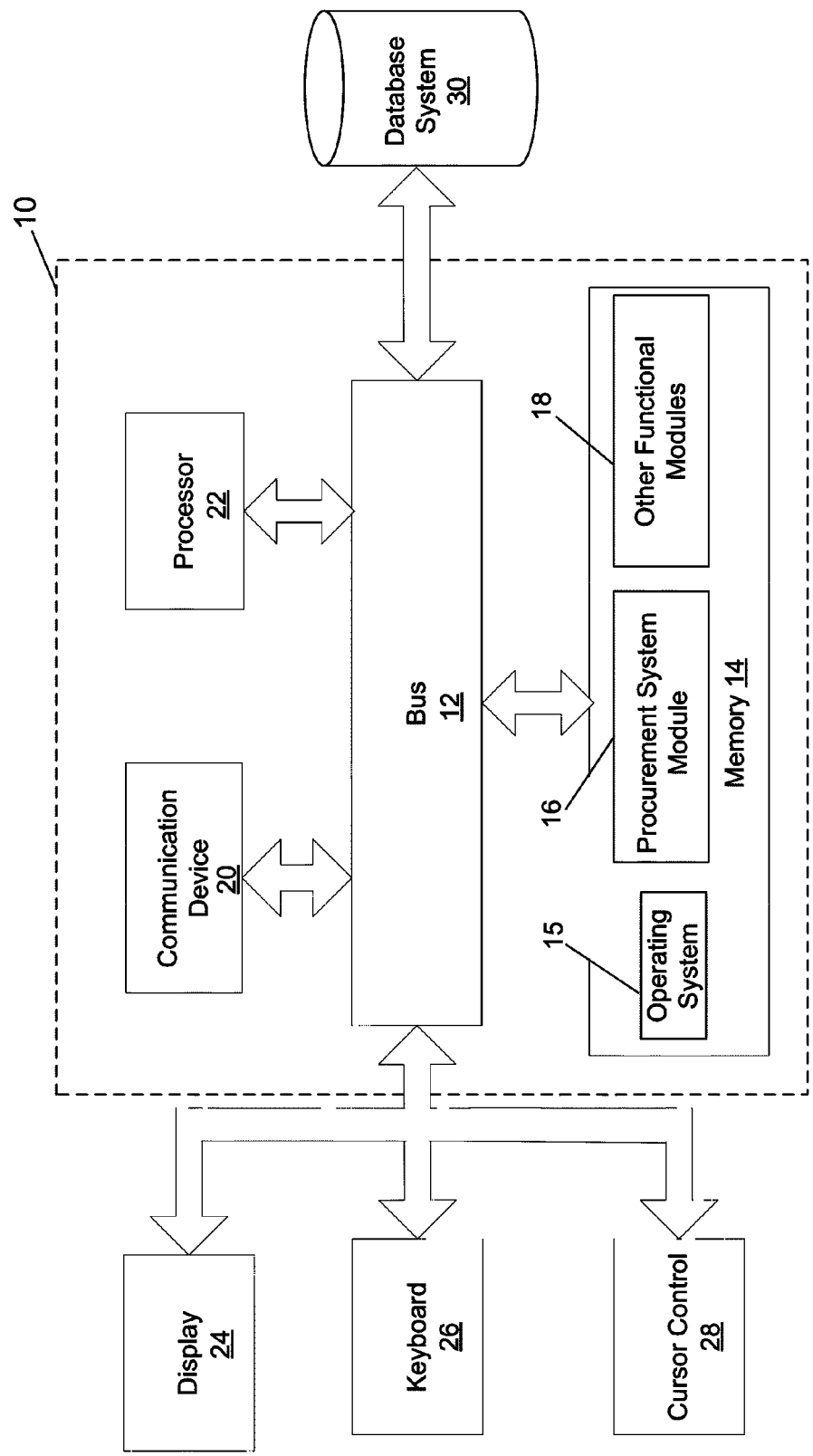
FIG. 1 illustrates a block diagram of a system that may implement an embodiment of the present invention.

In order to ensure that procurement systems are up to date and functioning properly, there are several areas of collaboration required between a purchaser and suppliers. These areas include purchasing agreements which impact the items that are available in a requisitioning business' local catalog of goods or services. Another area of collaboration is information templates that are used to collect additional requisition line information based on the nature of an item or a category that are required by the supplier. For example, when making a request or order for business cards from a printing supplier, the supplier will need the information to be printed (such as, job title, organization, etc.) as part of the placed order. The collected information will flow downstream from a requisition to a purchase order, and will be available to the supplier.

Yet another area of collaboration between purchasers and suppliers is with respect to supplier content map sets. These map sets are used in blanket purchase agreement upload processes and punchouts to external supplier sites. When uploading agreements using, for example, an excel spreadsheet provided by the supplier, external supplier values can be mapped to the customer's internal values if defined in the map set. Similarly, when items are returned from external supplier sites to a self service procurement system, the map sets can also contain the definitions to translate external values into internal values recognized by the procurement system.

Certain procurements systems may allow suppliers to edit purchase agreements and edit item information, such as price and description, etc. Upon submission of these changes, the buyer assigned to the agreement may review and disposition the changes. An administrator from the procurement department of the buyer will need to communicate with each of the suppliers who require information templates and/or map sets, and then create and edit the corresponding information template or map set. This can result in multiple iterations before an update can be completed.

Therefore, embodiments of the present invention provide a system for enhanced collaboration between procurement departments and their suppliers. According to one embodiment, the system provides suppliers with the ability to create and maintain their own procurement entities, such as information templates and supplier content map sets. Any time a modification is required, the supplier will be able to proactively update the procurement entity, instead of being required to contact the buyer's purchasing department and wait for an administrator to perform or approve the updates. In one embodiment, a mechanism is provided for customers or buyers to review and approve the changes prior to publishing the change to the procurement system. Certain embodiments also provide a mechanism for customers or buyers to enable/restrict the suppliers who can make changes or edits to procurement entity, and a mechanism to restrict which contents of the procurement entity can be edited by suppliers.

As a result of some embodiments, the shift in responsibility to supplier driven procurement entity maintenance will reduce turnaround time and reconciliation efforts that would otherwise be needed if the buyer's procurement department solely owned the responsibility for maintaining these procurement objects (i.e., information templates and map sets). Additionally, the maintenance process for procurement entities will be more streamlined and will result in fewer errors due to miscommunications. Thus, embodiments of the present invention may enhance customer collaboration with suppliers and will result in an easier to maintain procurement system.

FIG. 1 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments.

In one embodiment, memory 14 stores software modules that provide functionality when executed by processor 22. The modules may include an operating system 15 that provides operating system functionality for system 10. The memory may also store a procurement system module 16, which provides an enhanced procurement catalog maintenance solution through additional capabilities for collaboration with suppliers, as will be discussed in more detail below. System 10 may also include one or more other functional modules 18 to provide additional functionality.

Database system 30 may include a database server and any type of database, such as a relational or flat file database. Database system 30 may store data related to a procurement object, such as a procurement entity or file, the procurement system module 16, and/or any data associated with system 10 or its associated modules and components.

In certain embodiments, processor 22, procurement system module 16, and other functional modules 18 may be implemented as separate physical and logical units or may be implemented in a single physical and logical unit. Furthermore, in some embodiments, processor 22, procurement system module 16, and other functional modules 18 may be implemented in hardware, or as any suitable combination of hardware and software.

According to some embodiments, the procurement entity or file may be an information template, supplier content map set, punchout catalog, informational catalog, and/or smart forms.

When creating a requisition from the procurement system 10, the user first needs to add requisition lines to the document. There are several ways to add lines. If the buying company hosts their own catalog, they will be responsible for managing this content and requesters will search for these catalog items within the system 10. If the buying company allows suppliers to host their content, embodiments of the invention provide a punchout capability where the requesters are directed to the supplier's website through a link from the system 10. For example, a buying company may have selected a specific vendor as its office supplies vendor. The buying company can set up punchout protocols for requesters to click out to this vendor, find their items and then bring their shopping cart back to the procurement system 10 to complete the requisition.

To enable and/or set up this punchout relationship, the buying company may need to set up a punchout catalog that contains the supplier information, the uniform resource locator ("URL"), the supplier map set to apply, etc. According to certain embodiments, the suppliers can be tasked with maintaining this setup information related to the punchout catalog.

According to certain embodiments, informational catalogs are set up by the buying company to share additional information with the requesters using the procurement system. The informational catalogs can be available to the requesters as they navigate the system, and the requesters are able to drill down on the link to the pre-defined URL to see this information. For example, buying companies may use links associated with informational catalogs to share company purchasing policies, training materials, etc. However, the usage of informational catalog is flexible, and can be set up to link to supplier specific information as well. In one embodiment, suppliers are enabled to maintain their own informational catalogs.

According to one embodiment, smart forms are customized templates created by the buying company for the requesters to add a requisition line. For example, a buying company may set up a "Business Card" smart form that contains information such as the price, the unit of measure, the item description, the agreement, supplier information, etc. that pertains to that item. While these items can also be set up as items in the catalog, smart forms give buying companies more flexibility in customizing the information for the item, as well as to gather additional information from the requester. Information templates can be associated with smart forms, such that when the requester is filling out the form, the information templates are displayed for the requester to provide the information. In some embodiments, suppliers are provided the capability to create, customize and/or modify the smart forms.

Figure 2:
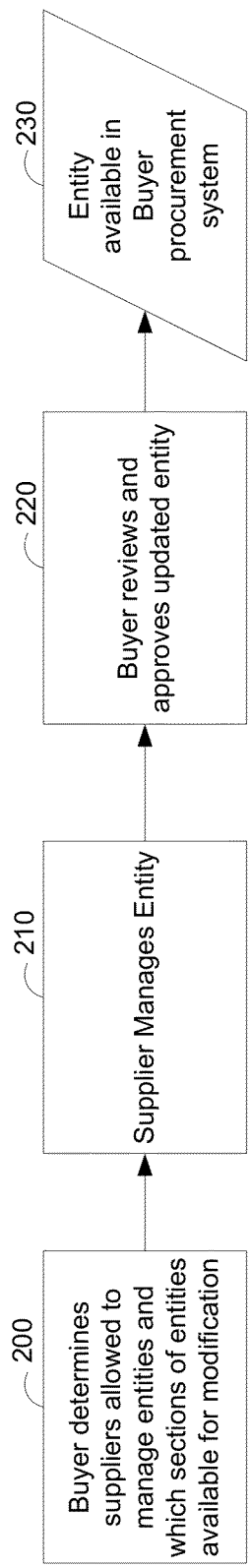
FIG. 2 illustrates a process flow chart according to one embodiment.

FIG. 2 illustrates a process flow diagram according to one embodiment. At 200, a buyer or customer can determine the suppliers who will be allowed to manage procurement entities related to their products and/or services. At 200, the buyer or customer can also determine which specific sections of the procurement entity can be modified by a particular supplier. In one embodiment, these determinations may be made one time initially and need not be performed every time a supplier modifies or creates a procurement entity. At 210, the supplier is able to manage the procurement entity outside of the buying company's firewalls. Managing the procurement entity may include creating a new procurement entity, modifying an existing procurement entity, editing particular sections of a procurement entity, or the like. In one embodiment, the procurement entity may include, for example, information templates, supplier content map sets, punchout catalogs, informational catalogs, and/or smart forms. At 220, the buyer or customer may review and approve the modifications or changes made by the supplier to the procurement entity. At 230, the procurement entity as modified or created by the supplier becomes available in the buying company's procurement system.

Figure 3:
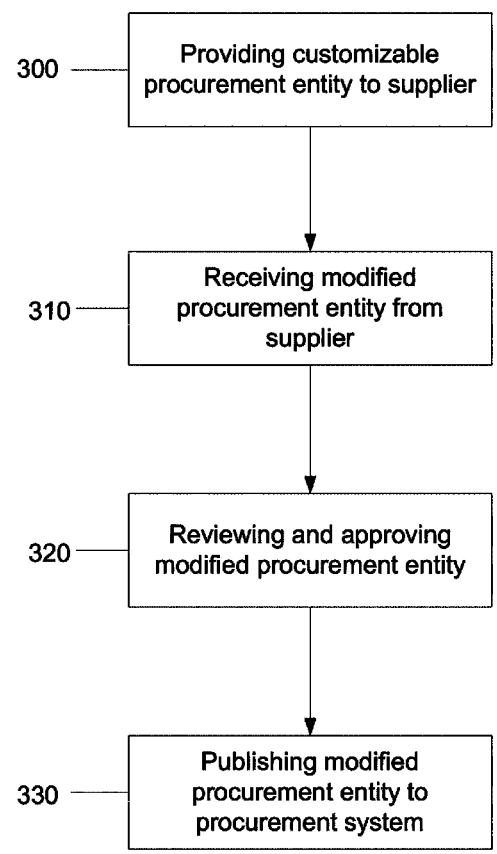
FIG. 3 illustrates a process flow chart according to another embodiment.

FIG. 3 illustrates a flow diagram of a method according to one embodiment. The method includes providing a customizable procurement entity to a supplier at 300. In some embodiments of the invention, however, the provision of the customizable procurement entity to the supplier may not be necessary because the supplier may already have access to the procurement entity. At 310, a modified procurement entity is received from the supplier. The modified procurement entity can include an update or change made by the supplier to the customizable procurement entity. Alternatively, instead of a modification of the customizable procurement entity, an entirely new procurement entity created by the supplier may be received. At 320, the modified procurement entity may be reviewed and approved by the buyer or procurement system. At 330, once the procurement entity is approved, the modified procurement entity is published to the procurement system. In certain embodiments, the modified procurement entity may be published without review and approval, for example, based on the supplier making the modification or based on the entries and/or modifications made.

In one embodiment, the functionality of the flow diagrams of FIG. 2 and FIG. 3 is implemented by software stored in memory, or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Figure 4:
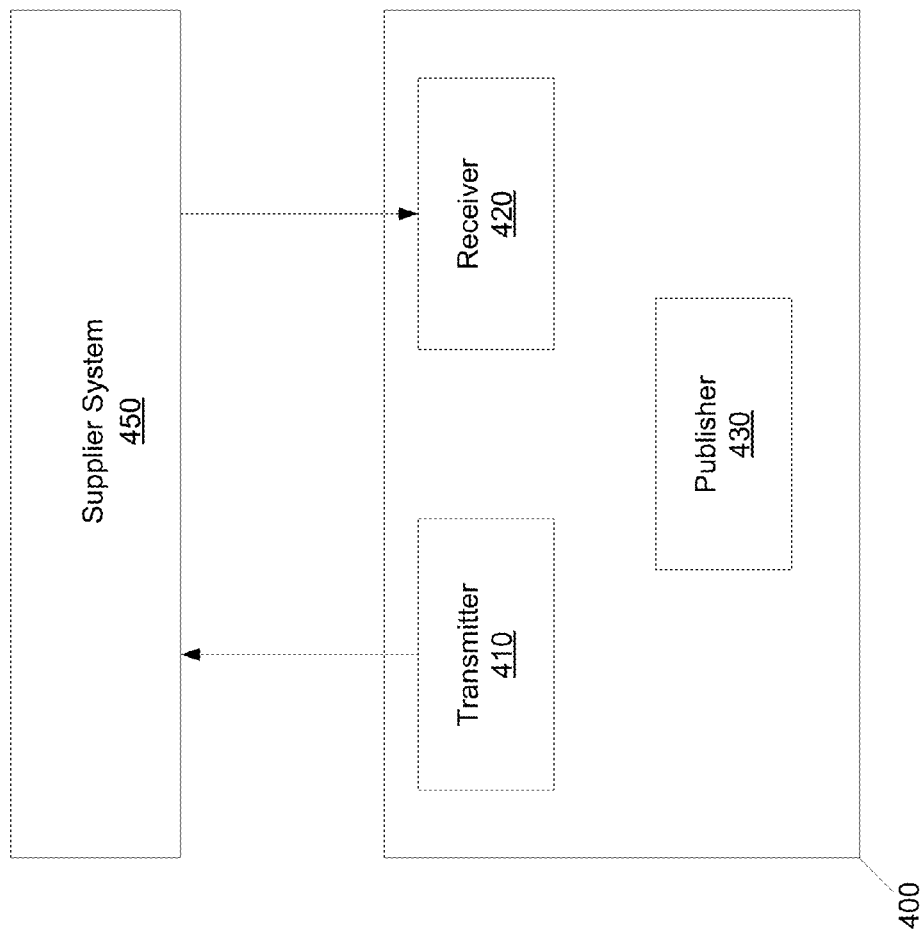
FIG. 4 illustrates an example of a system according to one embodiment.

FIG. 4 illustrates a system according to one embodiment of the invention. The system may include procurement system 400 and supplier system 450. Procurement system 400 includes a transmitter 410 that may be used to transmit a procurement entity to the supplier system 450. The procurement entity may include, for example, information templates and/or supplier content map sets. The supplier system 450 may then modify or alter the received procurement entity and return the procurement entity to the procurement system 400. The procurement system 400 may also include a receiver configured to receive the modified procurement entity from the supplier system 450. In one embodiment, the procurement system 400 allows for a review and approval of the received procurement entity. The procurement system 400 further includes a publisher 430 configured to publish the modified procurement entity for use in future procurement activities.

Figure 5:
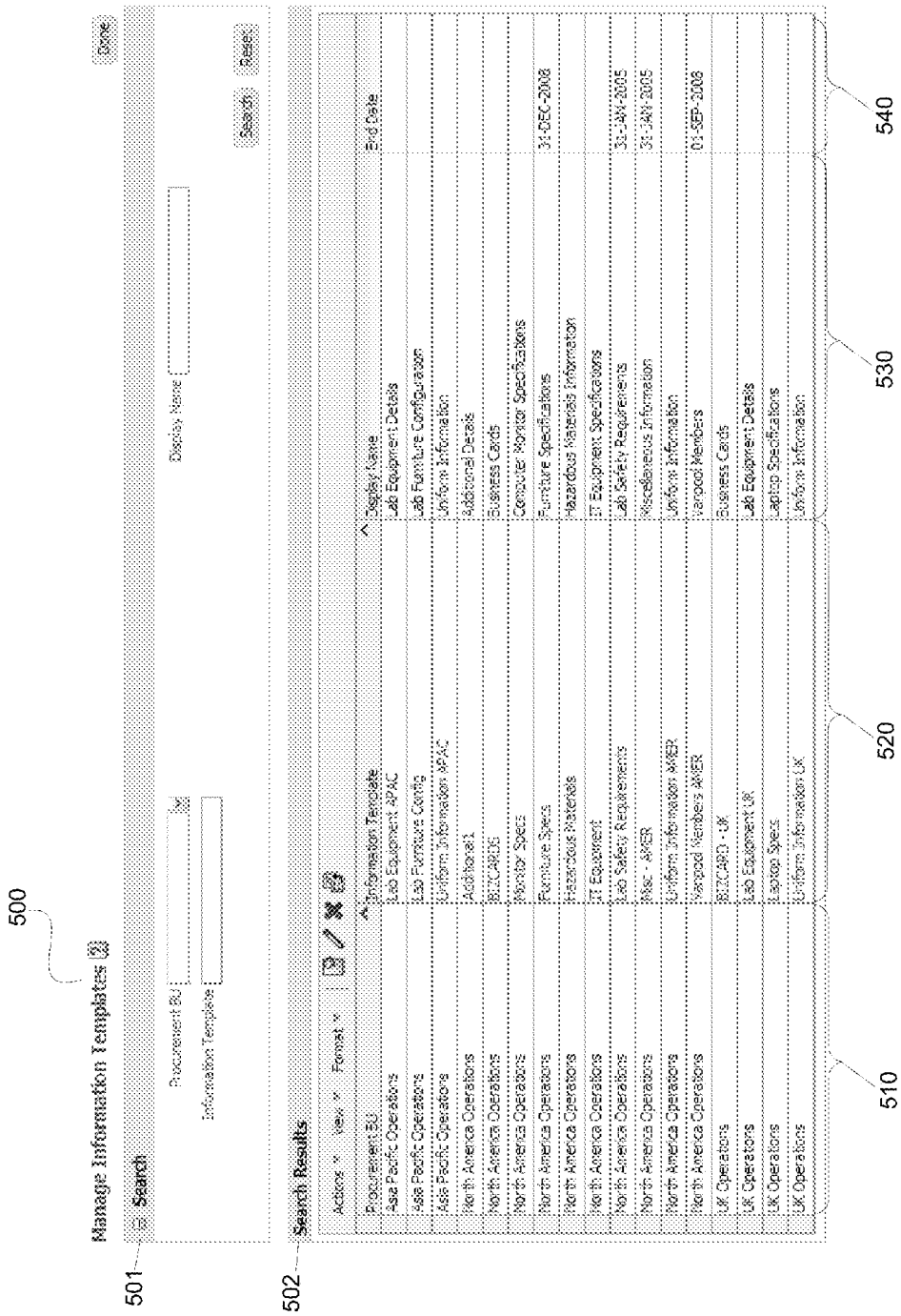
FIG. 5 illustrates a user interface according to one embodiment.

FIG. 5 illustrates a graphical user interface associated with the procurement system in accordance with one embodiment. More specifically, FIG. 5 illustrates an example of a manage information templates interface 500 that may be used by buyers and suppliers to manage, create and modify information templates. Manage information templates interface 500 includes a search panel 501 which allows users to search for an information template by procurement business unit, display name, or information template name. In addition, manage information templates interface 500 includes a search results panel 502 that displays a table of search results. The table may include a procurement business unit column 510, an associated information template column 520, a display name for the information template column 530, and an end date column 540.

Conventionally, a buying company's catalog administrator, such as the purchasing department's manager, would access the manage information templates interface 500 to access the list of information templates across the different business units. The administrator would be able to create new information templates and edit or remove information from existing templates. The administrator would usually be responsible for managing information templates based on requirements from multiple suppliers. As a result, the administrator would be required to constantly communicate with suppliers to determine their current requirements, naming conventions, etc. such that the procurement catalog contents and definitions are setup correctly. Embodiments of the present invention, however, may also provide the suppliers with access to the manage information templates interface 500, as well as permission to search for, create, and/or modify an information template. In one embodiment, suppliers may only have access to information templates associated with that supplier. In other embodiments, a supplier may be limited to modifying or editing, for example, only certain entries of an information template as specified by an administrator of the buyer. According to one example, a supplier may be provided with permission and access to create new information templates.

Figure 6:
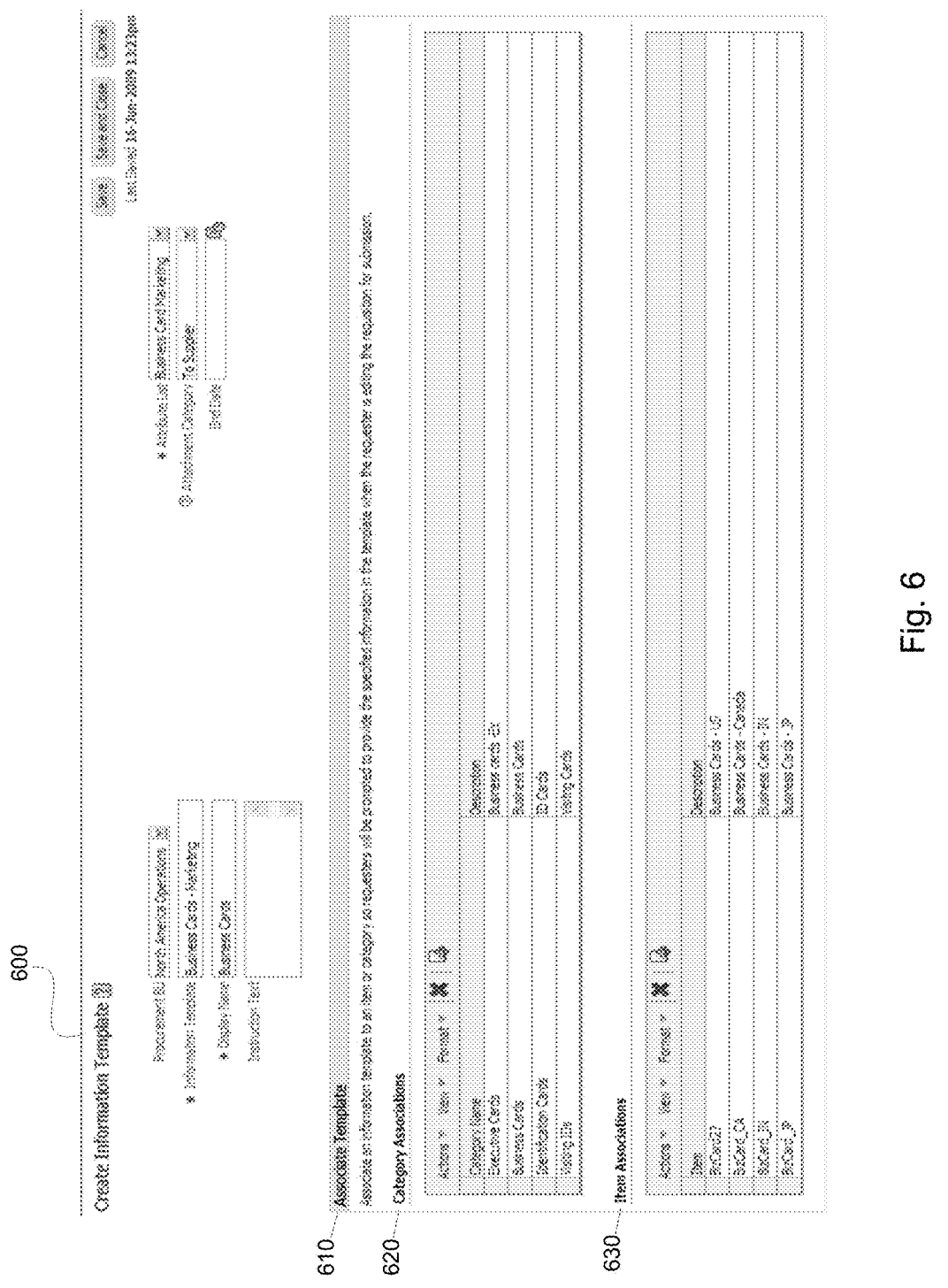

FIG. 6 illustrates a create information template interface 600 which is displayed when a user elects to create a new information template. In this example, a "Business Cards—Marketing" information template is illustrated. The create information template interface 600 includes an associate template 610 panel that allows for the association of an information template with an item or category so that requesters will be prompted to provide the specified information in the template when a requisition is being edited for submission. The associate template panel 610 includes a category associations section 620 listing the category names and descriptions for categories associated with the template. The associate template panel 610 also includes an item associations section 630 that lists the items and descriptions for items associated with the template. According to one embodiment, a supplier can provide the information template information and associate the template to specific items or categories. When these items or categories are requested via the procurement system, the requester will be prompted to enter the additional information. In one embodiment, the information templates are available immediately in the procurement system when saved and do not require any approvals. In one embodiment, the procurement system may be the Oracle Self Service Procurement product.

Figure 8:
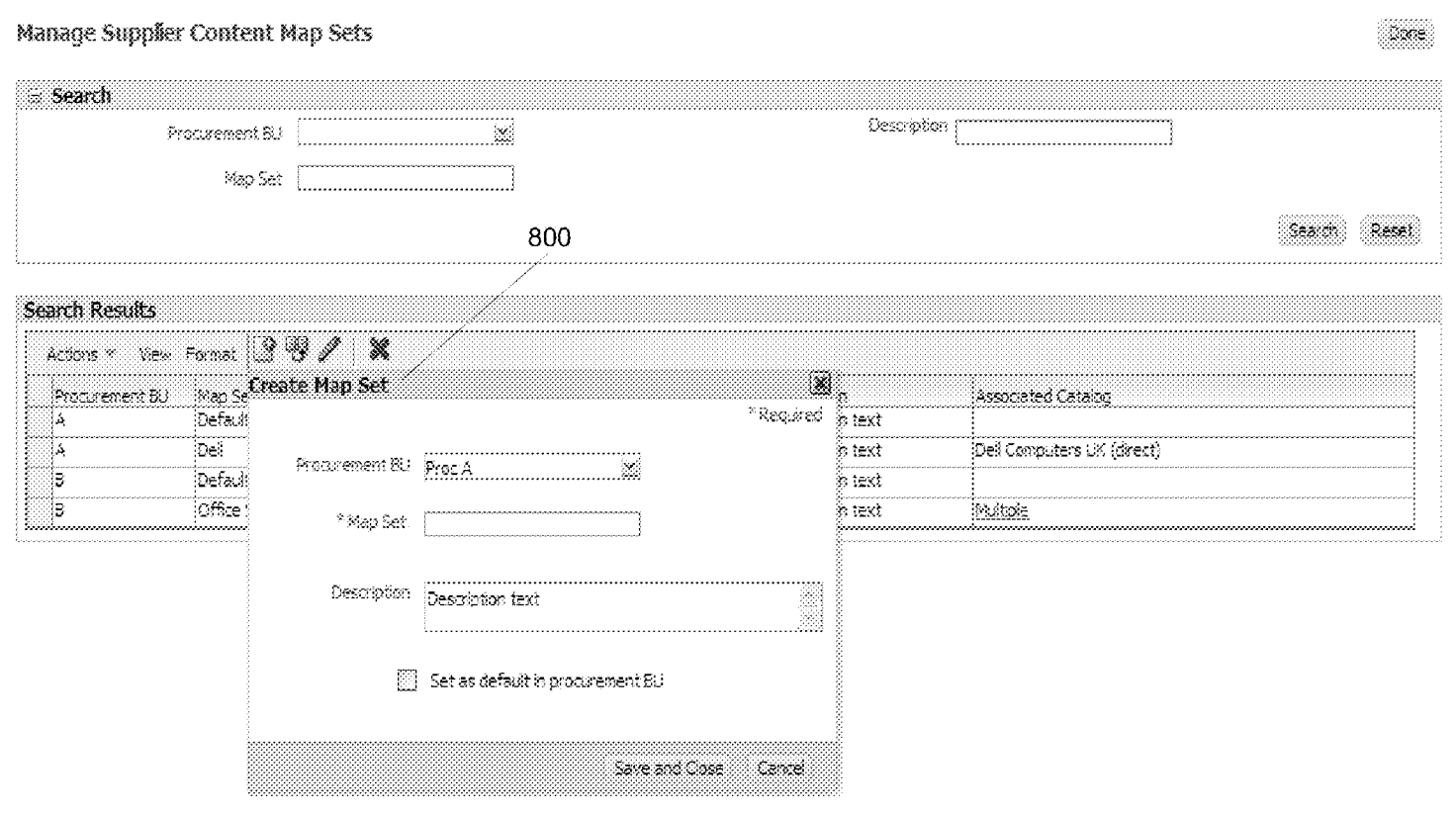

FIG. 7 illustrates a manage supplier content map sets interface 700 that may be used by buyers and suppliers to manage, create and modify map sets in accordance with one embodiment. Manage supplier content map sets interface 700 includes a search panel 710 which allows users to search for a map set by procurement business unit, description, or map set name. In addition, manage supplier content map sets interface 700 includes a search results panel 720 that displays a table of search results. The table may include a procurement business unit column, a map set column, a default in procurement business unit column, a manage maps column, a description column, and an associated catalog column. The manage supplier content map sets interface 700 may also include an icon 730 which a user may click to create a new map set. FIG. 8 illustrates a create map set window 800 that may be displayed when icon 730 is selected and which may be used by a supplier to create a new map set.

Figure 9:
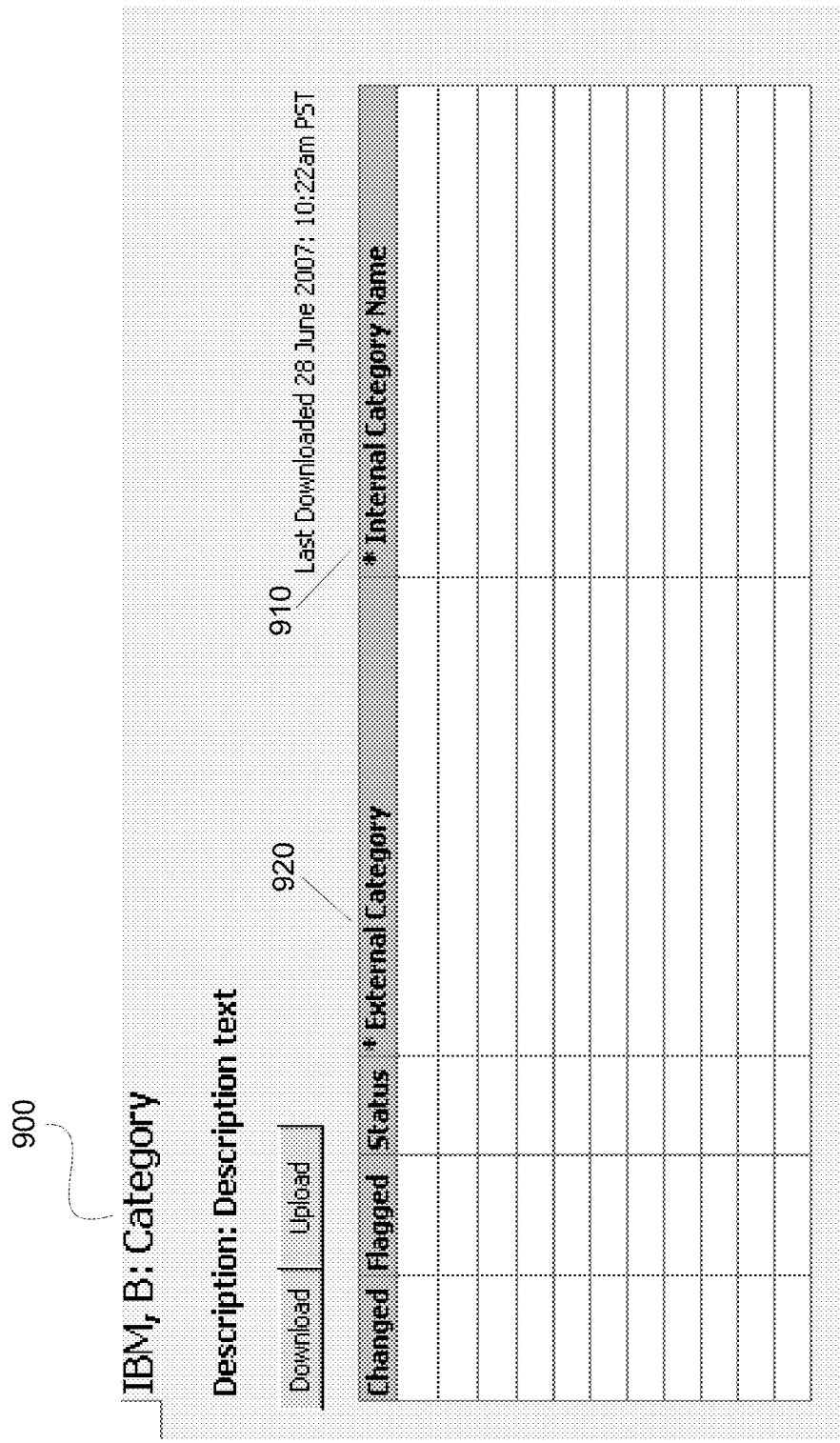
FIG. 9 illustrates a user interface according to another embodiment.

Once a new record or map set has been created, the user can manage the mapping values. For example, the term "Each" may be stored as "EA" in the buying company's system and "each" in the supplier company's system. Therefore, in order for transactions between the buying and supplier companies to flow, a mapping between "EA" and "each" can be created such that when the supplier company tries to return an item to the procurement system, the system will know to perform the translation from "each" to "EA." FIG. 9 illustrates an example of an interface 900 that can be used to create the necessary mappings. As illustrated, the interface 900 provides an internal category name column 910 and an external category name column 920 that can be used to associate the internal name with the external name thereby creating an appropriate mapping.

Figure 10:
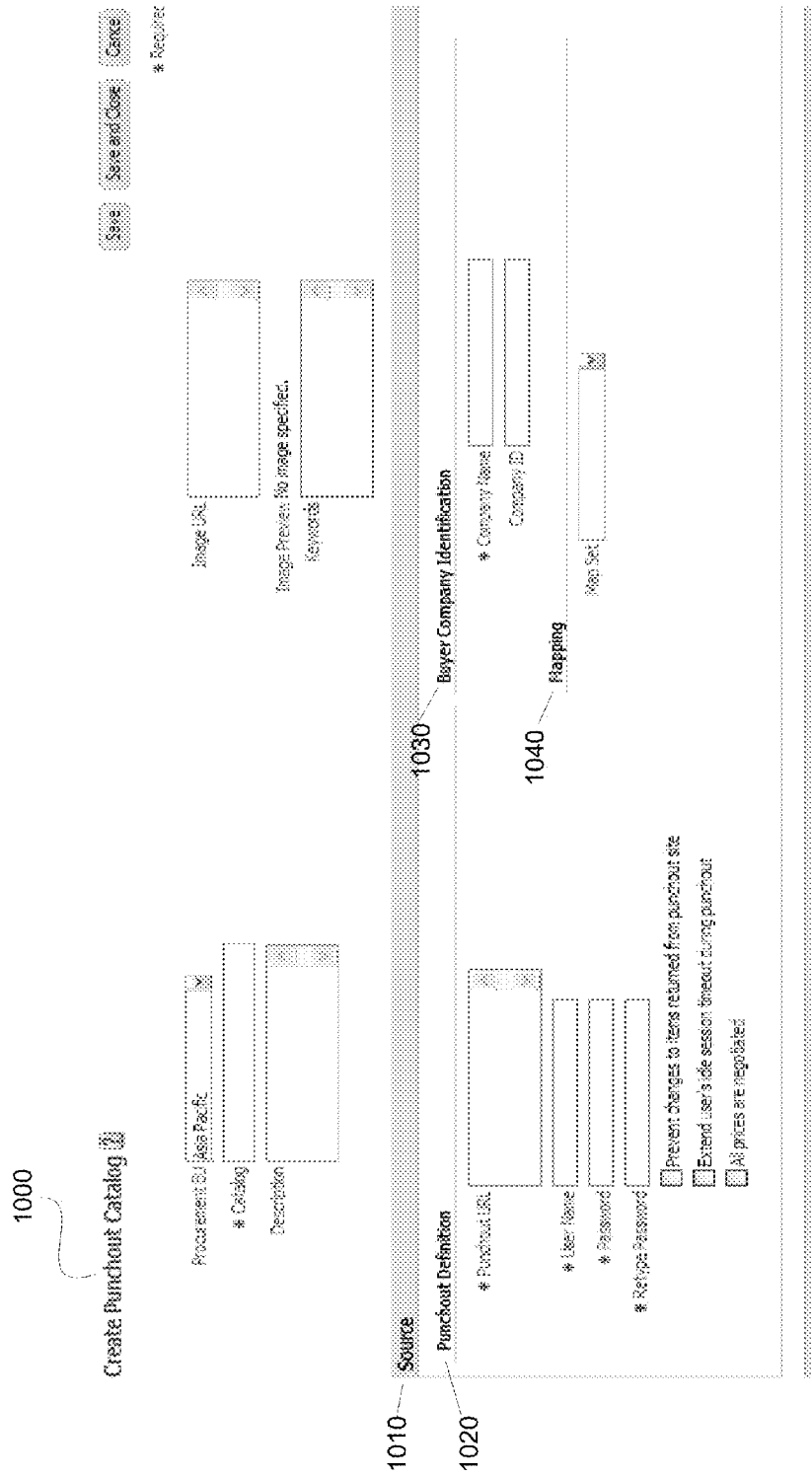
FIG. 10 illustrates a user interface according to another embodiment.

FIG. 10 illustrates a create punchout catalog interface 1000 that may be used by buyers and suppliers to manage, create and modify punchout catalogs in accordance with one embodiment. Create punchout catalog interface 1000 includes areas for identifying a catalog and providing its associated description. In addition, create punchout catalog interface 1000 has a source panel 1010 that includes a punchout definition section 1020, a buyer company identification section 1030, and a mapping section 1040.

Figure 11:
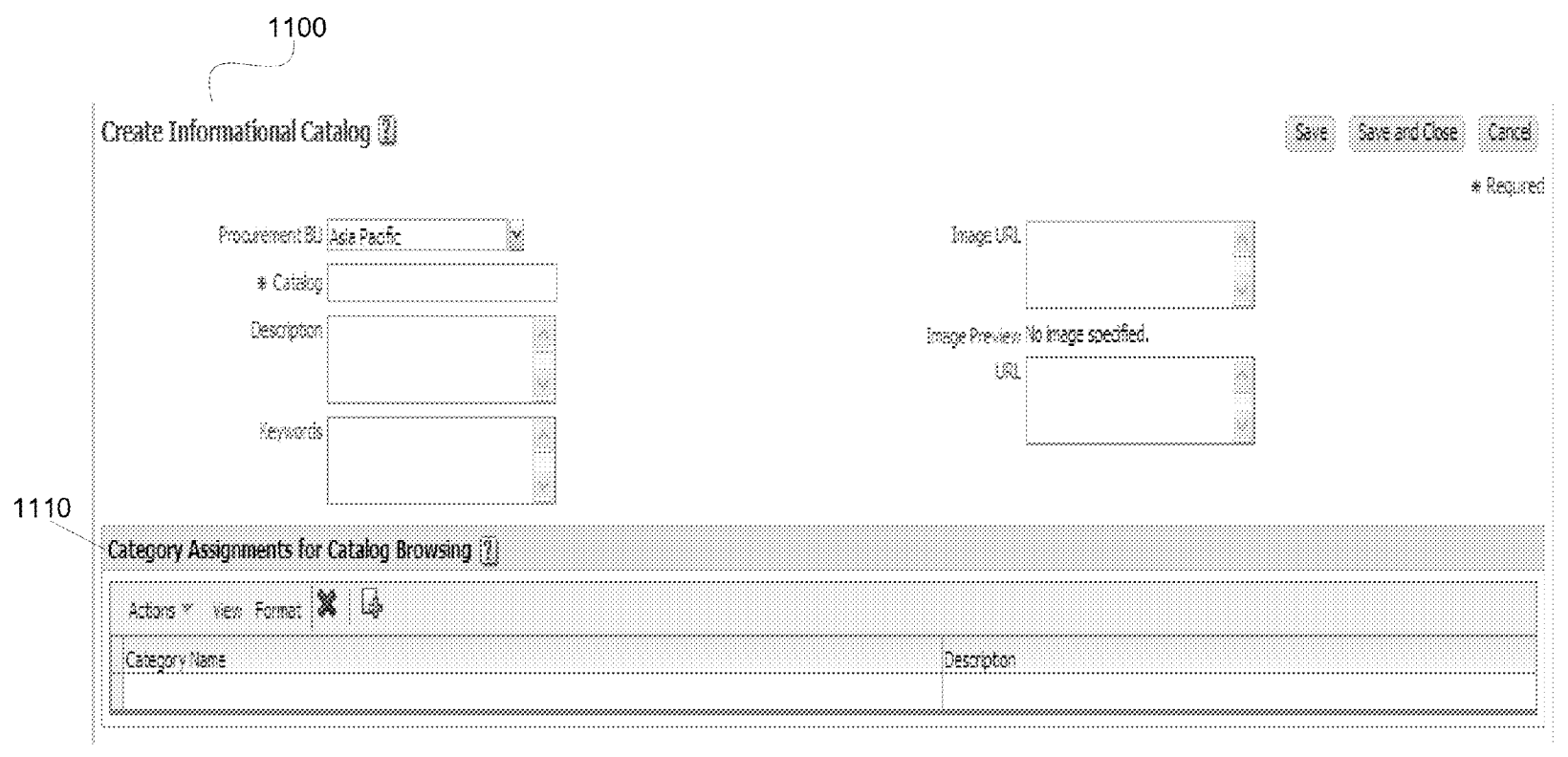

FIG. 11 illustrates a create information catalog interface 1100 that may be used by buyers and suppliers to manage, create and modify informational catalogs in accordance with one embodiment. Create information catalog interface 1100 includes areas for identifying a catalog and providing its associated description. Create information catalog interface 1100 also includes a category assignments panel 1110 that may be used to assign categories for catalog browsing.

Figure 12:
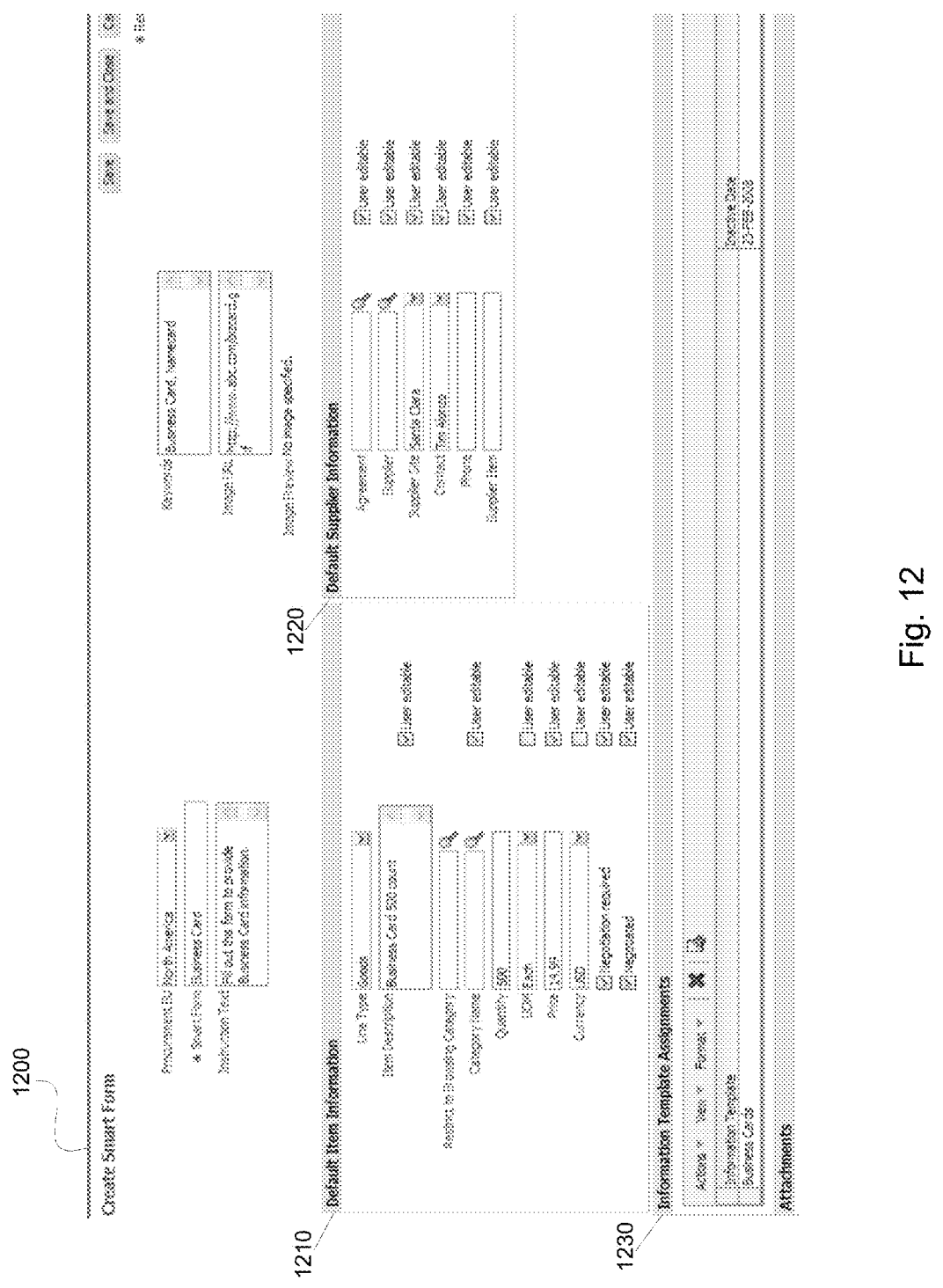

FIG. 12 illustrates a create smart form interface 1200 that may be used by buyers and suppliers to manage, create and modify smart forms in accordance with one embodiment. Create smart form interface 1200 includes a default item information panel 1210 for entering or defining various information regarding an item, such as quantity or price. Create smart form interface 1200 also includes a default supplier information panel 1220 that may be used to define or set information regarding the supplier. Additionally, create smart form interface 1200 includes an information templates assignment panel 1230 for associating an information template with the smart form.

As a result of certain embodiments, suppliers have the ability to maintain, create, and/or modify their own procurement entities, including information templates and map sets, instead of placing this responsibility solely with the buying company. In one embodiment, the buying company performs setup procedures to indicate which suppliers can maintain their own procurement entities, and what sections of the procurement entity can be maintained or modified by the suppliers. The suppliers will then have access to pages to manage (i.e., create, modify, delete) procurement entities that belong to them. The access to these pages can be outside of the buying company's firewalls. When a procurement entity is managed and saved by the supplier, the buying company may maintain the option to approve of the modifications prior to the procurement entity becoming available in the procurement system.

One having ordinary skill in the art will readily understand that the invention as discussed above may be practiced in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable storage medium having instructions stored thereon that, when executed by a processor, cause the processor to function as a procurement system comprising an electronic catalog of a plurality of products for purchase by a buyer from a supplier, the functioning comprising:

providing a customizable procurement entity from the buyer to the supplier, wherein at least one purchasing agreement is established between the buyer and the supplier that allows the buyer to purchase the products from the supplier using the electronic catalog, and wherein the providing comprises an initial approval from the buyer for the supplier to edit the procurement entity that corresponds to a product being purchased from the plurality of products;

receiving, by the buyer, a modified procurement entity from the supplier, wherein the modified procurement entity comprises an update made by the supplier to the customizable procurement entity, wherein the update is proactively updated by the supplier based on the initial approval;

reviewing and approving, by the buyer, the modified procurement entity, wherein the modified procurement entity is received by the buyer when a change occurs within the procurement system; and publishing the modified procurement entity to the procurement system;

wherein the procurement entity comprises an information template that provides information to the supplier from the buyer based on the product being purchased by the buyer, and a supplier content map set that contains definitions to translate external values into internal values recognized by the procurement entity.

2. The computer-readable storage medium of claim 1, wherein the procurement system enables or restricts suppliers to modify the procurement entity.

3. The computer-readable storage medium of claim 1, further comprising restricting contents of the procurement entity that can be modified by the supplier.

4. The computer-readable storage medium of claim 1, wherein the supplier content map sets comprise:

a search panel configured to allow users to search for a map set by procurement business unit, description, or map set name;

an interface configured to allow a user to create a new map set; and a search results panel configured to display a table of search results;

wherein the table comprises a procurement business unit column, a map set column, a default in procurement business unit column, a manage maps column, a description column, and an associated catalog column.

5. A procurement system, comprising:

an electronic catalog of a plurality of products for purchase by a buyer from a supplier;

a transmitter configured to provide a customizable procurement entity from the buyer to the supplier, wherein at least one purchasing agreement is established between the buyer and the supplier that allows the buyer to purchase the products from the supplier using the electronic catalog, and wherein the providing comprises an initial approval from the buyer for the supplier to edit the procurement entity that corresponds to a product being purchased from the plurality of products;

a receiver configured to receive a modified procurement entity from the supplier, wherein the modified procurement entity comprises an update made by the supplier to the customizable procurement entity, wherein the update is proactively updated by the supplier based on the initial approval, wherein the procurement system is configured to allow for review and approval of the modified procurement entity by the buyer, and wherein the receiver is configured to receive the modified procurement entity when a change occurs within the procurement system; and a publisher configured to publish the modified procurement entity to the procurement system;

wherein the procurement entity comprises an information template that provides information to the supplier from the buyer based on the product being purchased by the buyer, and a supplier content map set that contain definitions to translate external values into internal values recognized by the procurement entity.

6. The procurement system of claim 5, wherein the procurement system is configured to enable or restrict suppliers to modify the procurement entity.

7. The procurement system of claim 5, wherein the procurement system is configured to restrict contents of the procurement entity that can be modified by the supplier.

8. The procurement system of claim 5, wherein the supplier content map sets comprise:

a search panel configured to allow users to search for a map set by procurement business unit, description, or map set name;

an interface configured to allow a user to create a new map set; and a search results panel configured to display a table of search results;

wherein the table comprises a procurement business unit column, a map set column, a default in procurement business unit column, a manage maps column, a description column, and an associated catalog column.

9. A computer-implemented method for supplier update of a procurement system comprising an electronic catalog of a plurality of products for purchase by a buyer from a supplier, the method comprising:

providing, through the procurement system of the buyer, a customizable procurement entity to the supplier, wherein at least one purchasing agreement is established between the buyer and the supplier that allows the buyer to purchase products from the supplier using the electronic catalog, and wherein the providing comprises an initial approval from the buyer for the supplier to edit the procurement entity that corresponds to a product being purchased from the plurality of products;

receiving, through the procurement system of the buyer, a modified procurement entity from the supplier, wherein the modified procurement entity comprises an update made by the supplier to the customizable procurement entity, wherein the update is proactively updated by the supplier based on the initial approval;

reviewing and approving, by the buyer, the modified procurement entity, wherein the modified procurement entity is received by the buyer when a change occurs within the procurement system; and publishing the modified procurement entity to the procurement system;

wherein the procurement entity comprises an information template that provides information to the supplier from the buyer based on the product being purchased by the buyer, and a supplier content map set that contains definitions to translate external values into internal values recognized by the procurement entity.

10. The method of claim 9, further comprising enabling or restricting suppliers from modifying the procurement entity.

11. The method of claim 9, further comprising restricting contents of the procurement entity that can be modified by the supplier.

12. The method of claim 9, wherein the supplier content map sets comprise:

a search panel configured to allow users to search for a map set by procurement business unit, description, or map set name;

an interface configured to allow a user to create a new map set; and a search results panel configured to display a table of search results;

wherein the table comprises a procurement business unit column, a map set column, a default in procurement business unit column, a manage maps column, a description column, and an associated catalog column.

* * * * *